United States Patent
Amer et al.

(10) Patent No.: US 10,708,596 B2
(45) Date of Patent: Jul. 7, 2020

(54) FORCING REAL STATIC IMAGES

(71) Applicant: ATI TECHNOLOGIES ULC, Markham (CA)

(72) Inventors: Ihab Amer, Markham (CA); Fabio Gulino, Markham (CA); Edward Harold, Markham (CA); Boris Ivanovic, Markham (CA); Haibo Liu, Markham (CA); Ho Hin Lau, Markham (CA); Gabor Sines, Markham (CA); Catalin Beju, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 173 days.

(21) Appl. No.: 15/818,114

(22) Filed: Nov. 20, 2017

(65) Prior Publication Data
US 2019/0158836 A1 May 23, 2019

(51) Int. Cl.
| | |
|---|---|
| *H04N 19/127* | (2014.01) |
| *H04N 19/139* | (2014.01) |
| *H04N 19/182* | (2014.01) |
| *H04N 19/137* | (2014.01) |
| *H04N 19/154* | (2014.01) |
| *H04N 19/172* | (2014.01) |
| *H04N 19/132* | (2014.01) |

(52) U.S. Cl.
CPC ......... *H04N 19/127* (2014.11); *H04N 19/132* (2014.11); *H04N 19/137* (2014.11); *H04N 19/139* (2014.11); *H04N 19/154* (2014.11); *H04N 19/172* (2014.11); *H04N 19/182* (2014.11)

(58) Field of Classification Search
CPC .. H04N 19/139; H04N 19/182; H04N 19/103; H04N 19/127; G06T 9/00; G09G 2340/16
USPC .................................................. 382/239, 232
See application file for complete search history.

(56) References Cited

U.S. PATENT DOCUMENTS

| | | | | |
|---|---|---|---|---|
| 5,793,428 | A * | 8/1998 | Coelho | H04N 19/176 375/240.13 |
| 7,643,558 | B2 * | 1/2010 | Garudadri | H03M 13/29 375/240.23 |
| 8,913,668 | B2 * | 12/2014 | Ali | H04N 19/176 375/240.12 |
| 2017/0235828 | A1 * | 8/2017 | Philipose | G06K 9/00718 725/115 |
| 2019/0028710 | A1 * | 1/2019 | Fu | H04N 19/51 |

* cited by examiner

*Primary Examiner* — Daniel G Mariam

(57) ABSTRACT

An encoder of a multimedia system encodes data representative of each image in a video stream to form a bitstream that is transmitted over a network to a decoder that decodes the bitstream and provides the decoded information to a multimedia application for display to the user. As consecutive images may have nearly identical pixel values, the multimedia system detects pixel value variations between consecutive images that are below a specified threshold to reduce active processing on such pictures, which includes, for example, encoding, decoding, and post-processing. The multimedia system either selectively encodes or selectively processes the current image that has pixel values that vary from an immediately preceding image within the specified threshold.

13 Claims, 7 Drawing Sheets

FORCING REAL STATIC IMAGES

BACKGROUND

Multimedia servers generate data representative of pictures in a video stream, e.g., a video stream that has been requested by a user. An encoder encodes the data for each picture to form a bitstream that is transmitted over a network to a decoder that decodes the bitstream and provides the decoded video information to a multimedia application for display to the user. Such multimedia encoders and decoders are used in a wide variety of applications to facilitate the storage and transfer of multimedia streams in a compressed fashion.

Encoders implement video compression algorithms that use information from more than one picture to encode some types of received pictures. For example, an intra-coded picture (such as an I-frame) is a fully specified picture that is encoded and decoded without reference to any other picture. A predicted picture (such as a P-frame) is encoded and decoded with reference to one or more previous pictures and therefore typically requires fewer bits to encode than an intra-coded picture. A bi-directional predicted picture (such as a B-frame) is encoded and decoded with reference to one or more previous pictures and/or one or more subsequent pictures. The bi-directional predicted picture typically requires fewer bits to encode than an intra-coded picture or a predicted picture. Encoding and decoding pictures based on previous or subsequent pictures reduces the amount of information transmitted between the encoder and the decoder, as well as reducing the workload at the decoder. Encoding, transmitting, and decoding video frames consumes bandwidth and computational resources, particularly for intra-coded frames that must be independently encoded and decoded. In some instances, consecutive pictures are essentially identical (i.e., the scene is "static" between the two pictures), but slight differences due to quantization noise or other factors cause them to be encoded as distinct pictures, resulting in the unnecessary consumption of computing resources and bandwidth in encoding, transmitting, and decoding of essentially duplicate images.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Many multimedia applications, such as screen sharing, virtual desktop infrastructure (VDI), and streaming of presentations or slides are dominated by static content in which there often is no meaningful variation from one image to the next. However, a typical lossy encoder or compression engine introduces quantization noise in the process of encoding an image, which results in variations in pixel values even between identical source images. Detecting pixel value variations between consecutive images that are below a specified threshold, as described herein, facilitates the conservation of bandwidth and/or processing resources to encode and process nearly identical images. By either selectively encoding or selectively processing a current image that has pixel values that vary from an immediately preceding image within a threshold, a multimedia system as described herein leverages optimizations that depend on pixel-identical content between consecutive images.

In at least some embodiments, the multimedia system includes a comparator to compare a current source image (referred to as the "T" image) to the source image that immediately preceded the current source image (referred to as the "T–1" image). If the pixel value variations between the T image and the T–1 image are non-zero and below a threshold, an encoder of the multimedia system either ignores the T image, force skips the T image, or encodes the T image and transmits the encoded image with a flag indicating the magnitude of pixel value variations between the T image and the T–1 image to a decoder. If the encoder ignores the T image, the decoder and any post-processing modules (such as scaling modules and color space conversion modules) will be placed in a lower-power mode (e.g., "put to sleep") during the time in which the T image would have been processed had the T image been encoded. If the encoder forces a skip image, in some embodiments, the decoder transmits a signal to the post-processing modules to remain in sleep mode.

If the encoder encodes the current source image and transmits the encoded image with a flag indicating the pixel value variations, the decoder decodes the current image to be used as a reference and in order to remain synchronized with the encoder. If the decoder determines from the flag that the quality gained by processing the current image does not justify the resources that would be required to process the current image, the decoder signals post-processing modules to remain in sleep mode.

Figure 1:
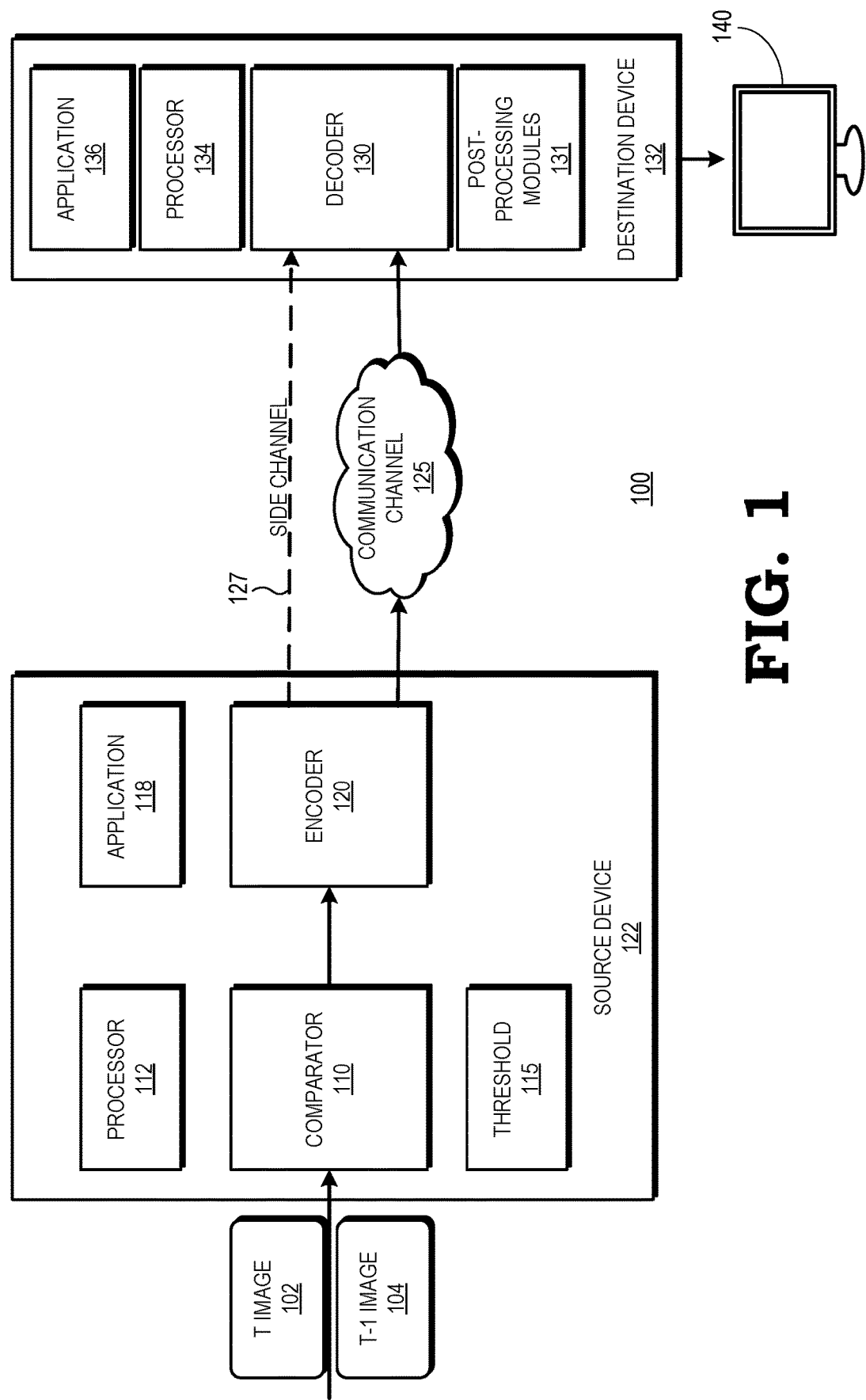
FIG. 1 is a block diagram of a multimedia system that employs selective suppression of picture encoding in accordance with some embodiments.

FIG. 1 is a block diagram of a multimedia system 100 that includes a comparator 110 for detecting a magnitude of pixel variations between consecutive images and signaling an encoder 120 to suppress encoding a current image in response to the pixel variations being below a threshold 115 in accordance with some embodiments. In some embodiments, the multimedia system 100 is distributed across a variety of electronic devices, such as a server, personal computer, tablet, set top box, gaming system, mobile phone, and the like. The comparator 110 is implemented as, for example, processors executing software, programmable logic, hard-coded logic, or a combination thereof. The comparator 110 is implemented with or otherwise associated with a source device 122 that communicates with a destination device 132 via a communication channel 125 to provide images for display at a display device 140.

The source device 122 includes one or more processors 112 that are configured to execute a multimedia application 118 that generates information representative of a multimedia stream. The multimedia application 118 is implemented as a set of executable instructions that are executed by the one or more processors 112 and which manipulate the one or more processors 112 and other computing resources to perform the functionality described herein. For example, the multimedia application 118 generates digital information that represents a stream or sequence of images in a multimedia stream. The term "multimedia" refers to either video only or a combination of video and audio.

The multimedia application 118 provides the digital information representative of a stream of images to an encoder 120 that encodes the digital information for transmission over a communication channel 125 such as a wide area network (WAN), an intranet, an Internet, a wireless network, and the like. For example, in some embodiments the encoder 120 is used to encode the digital information according to an encoding standard such as Moving Picture Expert Group ("MPEG")-2, MPEG-4, Advanced Video Coding ("AVC"), and the like. In some embodiments, the encoder 120 is a hardware encoder or software executed by the one or more processors. The encoder 120 can encode information representative of the pictures generated by the application without reference to any other pictures. For example, the encoder 120 generates intra-coded images (which are also referred to as I-frames) using only information representative of the current image and without reference to any previously or subsequently encoded images. As used herein, the terms "previous" and "subsequent" referred to relative positions of the images in encoding or decoding order.

In some embodiments, the encoder 120 also encodes images based on one or more previously or subsequently encoded pictures. For example, in some embodiments the encoder 120 generates predicted images (which are also referred to as P-frames) using information representative of the current image and one or more previous images. A predicted image includes image data, motion vector displacements of features in the image relative to corresponding features in the one or more previous images, or a combination thereof. For another example, in some embodiments the encoder 120 generates bidirectional predicted images (which are also referred to as B-frames) using information representative of the current image, one or more previous images in decoding order, and one or more subsequent images. A bidirectional predicted image typically includes image data, motion vector displacements of features in the picture relative to corresponding features in the previous or subsequent images, or a combination thereof.

The destination device 132 includes one or more processors 134 that are used to implement a decoder 130, post-processing modules 131, and a display application 136. For example, in some embodiments the application 136 is implemented as a set of executable instructions that are executed by the one or more processors 134 and which manipulate the one or more processors 134 and other computing resources to perform the functionality described herein. In some embodiments, the decoder 130 is implemented as a hardware decoder or a software decoder, e.g., as a set of executable instructions.

Post-processing modules 131 are hardware or software modules configured to perform image processing that follows decoding, which includes but it is not limited to scaling, color space conversion, quality/perceptual enhancements (such as color enhancement, denoising, sharpness enhancement, etc.). Processing includes the computations to perform these functions and additional write to memory, both of which consume power, computation resources, memory bandwidth, etc. Processing further includes informing the display hardware or display compositor (e.g., via Display Window Manager (DWM) in Windows) that the screen must be updated, which consumes further additional power, computation resources, memory bandwidth, etc.

The source device 122 and the destination device 132 are depicted in FIG. 1 as single devices. However, some embodiments of the source device 122 or the destination device 132 are implemented as multiple devices that exchange signals. For example, in some embodiments, the source device 122 is implemented as a first device (such as a camera or a processor configured to generate multimedia) that executes the multimedia application 118 and a second device that implements the encoder 120. For another example, in some embodiments, the destination device 132 is implemented as a first device (such as a display or a graphics card) that executes the display application 136 and a second device that implements the decoder 130.

To facilitate conservation of bandwidth and computational resources, the multimedia system 100 includes the comparator 110 configured to compare pixel values of a current source image (referred to as the "T image" 102) to the corresponding pixel values of the image that immediately preceded the T image 102 (referred to as the "T−1 image" 104) to determine the magnitude of variations in pixel values between the T image 102 and the T−1 image 104 (also referred to as bitstream residuals). For example, if the T image 102 and the T−1 image 104 are YUV images that include information defining a color image in a YUV color space that defines the luminance (Y) and chrominance (UV) components for pixels in the image, in some embodiments, the comparator 110 compares the YUV values of the T image 102 and the T−1 image 104. In some embodiments, the comparator 110 compares an approximate signature for the T image 102 to an approximate signature for the T−1 image 104 based on approximate values of pixels representative of the respective images. In some embodiments, the comparator 110 determines the maximum difference between the T image 102 and the T−1 image 104. In some embodiments, the comparator 110 determines the average difference between the T image 102 and the T−1 image 104. In some embodiments, the comparator 110 determines the average difference between the T image 102 and the T−1 image 104 as well as the standard deviation, variance, or other summary statistics.

In some embodiments, the approximate signatures are generated by hashing or applying a cyclic redundancy check (CRC) to a selected subset of the bits representative of each pixel in the respective images. In some embodiments, the approximate signatures are generated by grouping the pixels into blocks, averaging the values of the pixels in each block, and then hashing or applying a CRC to the average values for the blocks in the image. In some embodiments, the selection of subsets of the bits in each pixel and averaging pixel values over blocks is performed prior to hashing or prior to applying the CRC to generate the approximate signatures.

The comparator 110 is further configured to compare the pixel value or signature variations (referred to as pixel value variations) between the T image 102 and the T−1 image 104 to a threshold 115. If the magnitude of the pixel value variations is below the threshold 115, the comparator 110 signals the encoder 120 that the pixel value variations are below the threshold 115. In some embodiments, the application 118 signals the encoder 120 that the T image 102 is a pixel-accurate copy of the T−1 image 104. The comparator 110 and the source device 122 are depicted in FIG. 1 as separate entities. However, in some embodiments the comparator 110 is included in the source device 122. In some embodiments the comparator 110 is incorporated within the encoder 120.

The encoder 120 is configured selectively suppress encoding the T image 102 in response to receiving a signal from the comparator 110 indicating that the pixel value variations are below the threshold 115. In some embodiments, the encoder 120 ignores the T image 102 and suppresses encoding the T image 102 and transmitting the T image 102 across the communication channel 125. In some embodiments, the encoder 120 forces a skip frame in the bitstream in place of the T image 102. A skip frame informs the decoder 130 that the T image 102 has been skipped, and allows the decoder 130 to remain synchronized with the encoder 120. In some embodiments, the encoder 120 encodes the T image 102 normally in response to receiving a signal from the comparator 110 indicating that the pixel value variations are below the threshold 115.

In some embodiments, a side channel 127 allows the encoder 120 to communicate with the decoder 130. The side channel 127 is implemented, for example, as a TCP/IP side channel, a hardwire link between the devices 122, 132, as a metadata channel embedded in a multimedia bitstream transmitted between the devices 122, 132 or any other communication channel for direct communications between the encoder 120 and the decoder 130. If the encoder 120 is in communication with the decoder 130 via a side channel 127, in some embodiments the encoder 120 transmits a flag or other signal (not shown) to the decoder 130 in response to receiving a signal from the comparator 110 indicating that the pixel value variations are below the threshold 115. In some embodiments, the flag indicates whether the T image 102 matches the T−1 image 104. In some embodiments, the flag indicates whether the T image 102 was force skipped.

In some embodiments, the encoder 120 transmits information to the decoder 130 via the side channel 127 indicating the pixel value variations between the T image 102 and the T−1 image 104. The pixel value variations between the T image 102 and the T−1 image 104 indicate the significance of the encoded residuals in gaining image quality between the T image 102 and the T−1 image 104. For example, in a screen sharing application, a T image 102 may have a higher image quality than a T−1 image 104 that directly preceded the T image 102, resulting in increased sharpness for the T image 102, even though the unencoded pixel values for the T image 102 and the T−1 image 104 may be identical. Based on the information the encoder 120 transmits to the decoder 130 via the side channel 127, the decoder 130 determines whether to expend resources decoding the T image 102 or to signal post-processing modules (not shown) to remain in sleep mode and replicate previous results for the T−1 image 104 to conserve power.

In some embodiments, if the encoder 120 ignores the T image 102 in response to receiving a signal from the comparator 110 indicating that the pixel value variations are below the threshold 115, the decoder 130 does not receive an encoded image at the time the T image 102 would have otherwise been transmitted. The decoder 130 signals post-processing modules 131 to remain in sleep mode and replicate previous results for the T−1 image 104. In some embodiments, if the encoder 120 forces a skip image in lieu of encoding and transmitting the T image 102, the decoder 130 suppresses decoding the skip image in order to conserve resources.

In some embodiments, if the encoder 120 encodes the T image 102 normally and transmits information to the decoder 130 via the side channel 127 indicating the pixel value variations, the decoder 130 determines whether to suppress processing the T image 102 based on the information. The decoder 130 selectively suppresses processing the T image 102 based on the information and system conditions, such as battery and/or temperature status. In some embodiments, the encoder is configured to encode normally, and the comparator 110 is incorporated within the decoder 130. The comparator 110 compares the encoded T image 102 to the encoded T−1 image 104 to determine the magnitude of pixel value variations between the T image 102 and the T−1 image 104. Based on the magnitude of pixel value variations, the post-processing modules 131 of the destination device 132 process the decoded T image 102.

In some embodiments, the destination device 132 includes a comparator. In some embodiments, the decoder 130 signals the post-processing modules 131 of the destination device 132 to process the decoded T image 102 based on whether analyses using one or more of variance, histograms, average, standard deviation, and/or quantization parameters indicate that the accumulated differences between the T image 102 and the T−1 image 104 are below a threshold.

In operation, the comparator 110 receives the T image 102 and the T−1 image 104. The comparator 110 compares the pixel values and/or approximate signature of the T image 102 to the corresponding pixel values and/or approximate signature of the T−1 image 104 to determine the magnitude of accumulated differences between the T image 102 and the T−1 image 104. The comparator 110 compares the magnitude of accumulated differences between the T image 102 and the T−1 image 104 to the threshold 115. If the accumulated differences between the T image 102 and the T−1 image 104 are below the threshold 115, the comparator 110 signals the encoder 120 that the pixel value variations are below the threshold 115. In response to receiving a signal that the pixel value variations are below the threshold 115, the encoder 120 selectively suppresses encoding the T image 102, and either ignores the T image 102 or forces a skip image, or in some embodiments, the encoder 120 encodes the T image 102 and transmits a flag or information to the decoder 130 via the side channel 127 indicating that the pixel value variations are below the threshold 115.

In response to the encoder 120 selectively suppressing encoding the T image 102, the decoder 130 selectively suppresses decoding the T image 102. In response to the encoder 120 ignoring the T image 102, the decoder does not receive the T image 102, and signals post-processing modules of the playback pipeline to enter or remain in a sleep mode. In response to the encoder 120 forcing a skip image, the decoder 130 detects that the skip image is the same as the T−1 image based on YUV or signature comparisons, and the decoder 130 signal post-processing modules of the playback pipeline to enter or remain in a sleep mode. In some embodiments, the encoder 120 forces a skip image via the communication channel 125 and transmits to the decoder 130 a flag or information via the side channel 127 indicating that a skip image has been forced. In response to receiving the flag or information indicating a skip image, the decoder 130 selectively suppresses decoding the skip image, and signals post-processing modules to enter or remain in a sleep mode, resulting in power conservation.

In response to the encoder 120 encoding the T image 102 normally and transmitting a flag or information indicating that the pixel value variations are below the threshold 115, the decoder selectively suppresses processing the T image 102. If the information and system conditions, such as battery and/or temperature status, indicate that the pixel value variations do not justify the resources that would be used to process the T image 102, the decoder 130 suppresses processing the T image 102 by signaling the post-processing modules 131 to enter or remain in sleep mode.

Figure 2:
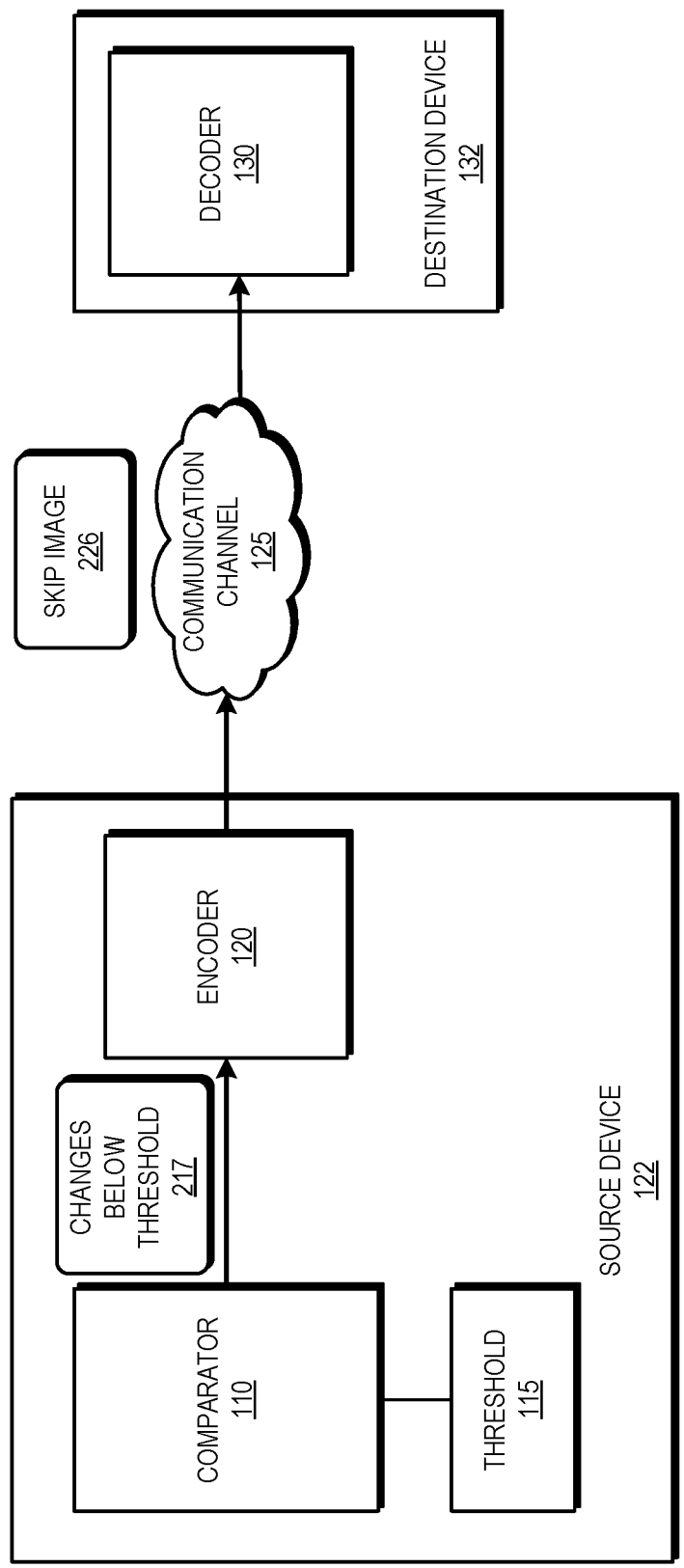
FIG. 2 is a block diagram of an encoder of the multimedia system of FIG. 1 while in operation to force a skip image in accordance with some embodiments.

FIG. 2 is a block diagram of the encoder 120 of the source device 122 of the multimedia system 100 of FIG. 1 forcing a skip image 226 in response to the comparator 110 detecting that pixel value variations between consecutive images are below the threshold 115 in accordance with some embodiments. The comparator 110 compares pixel values or a signature of a current image (not shown) to the corresponding pixel values or signature of the immediately preceding image, and then compares the accumulated pixel value variations or other calculated differences to the threshold 115. If the accumulated pixel value variations are below the threshold 115, the comparator 110 transmits to the encoder 120 a signal 217 indicating that the accumulated pixel variations are below the threshold 115.

In the example illustrated in FIG. 2, the encoder 120 forces a skip image in response to receiving the signal 217 indicating that the accumulated pixel variations are below the threshold 115. The encoder 120 transmits the skip image 226 to the decoder 130 of the destination device 132 of the multimedia system 100 of FIG. 1 via the communication channel 125.

Figure 3:
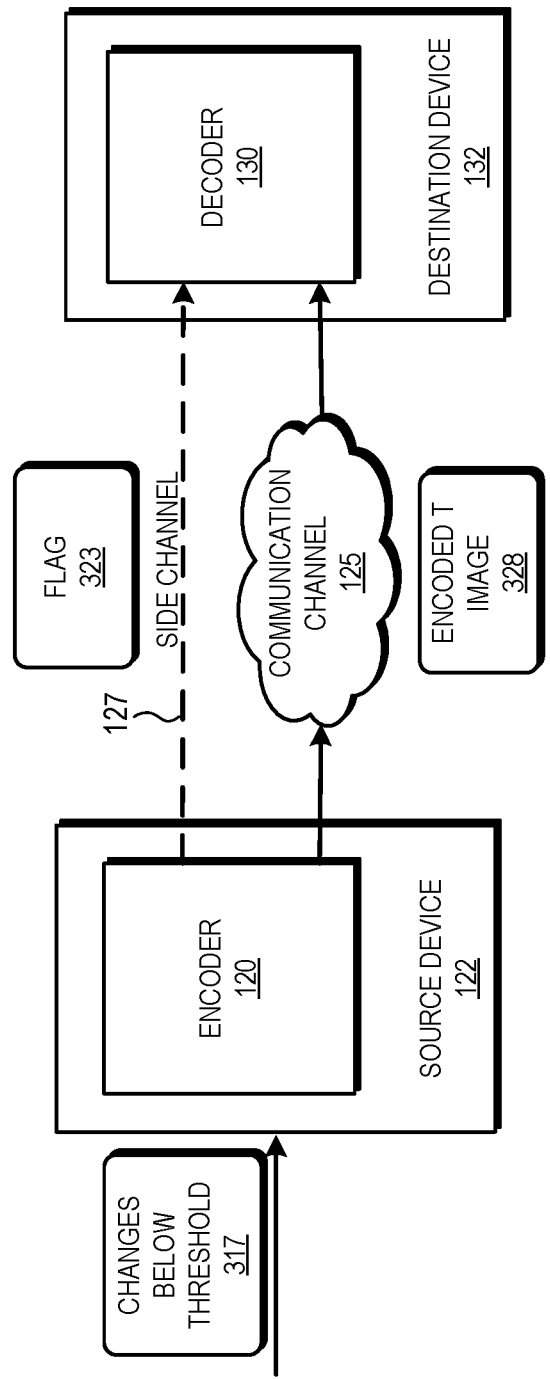
FIG. 3 is a block diagram of the encoder of the multimedia system of FIG. 1 while in operation to transmit to a decoder a flag indicating that pixel value variations between consecutive images are below a threshold in accordance with some embodiments.

FIG. 3 is a block diagram of the encoder 120 of the source device 122 of the multimedia system 100 of FIG. 1 transmitting to the decoder 130 of the destination device 132 a flag 323 indicating that pixel value variations between consecutive images are below a specified threshold (not shown) in accordance with some embodiments. The encoder 120 receives a signal 317 indicating that the accumulated pixel value variations between the current image (the T image) and the immediately preceding image are below the threshold. In response to receiving the signal 317, the encoder 120 encodes the T image and transmits the encoded T image 328 to the decoder 130 via the communication channel 125. In the example illustrated in FIG. 3, the encoder 120 also generates the flag 323 indicating that the pixel value variations are below the threshold. The encoder 120 transmits the flag 323 to the decoder 130 via the side channel 127.

Figure 4:
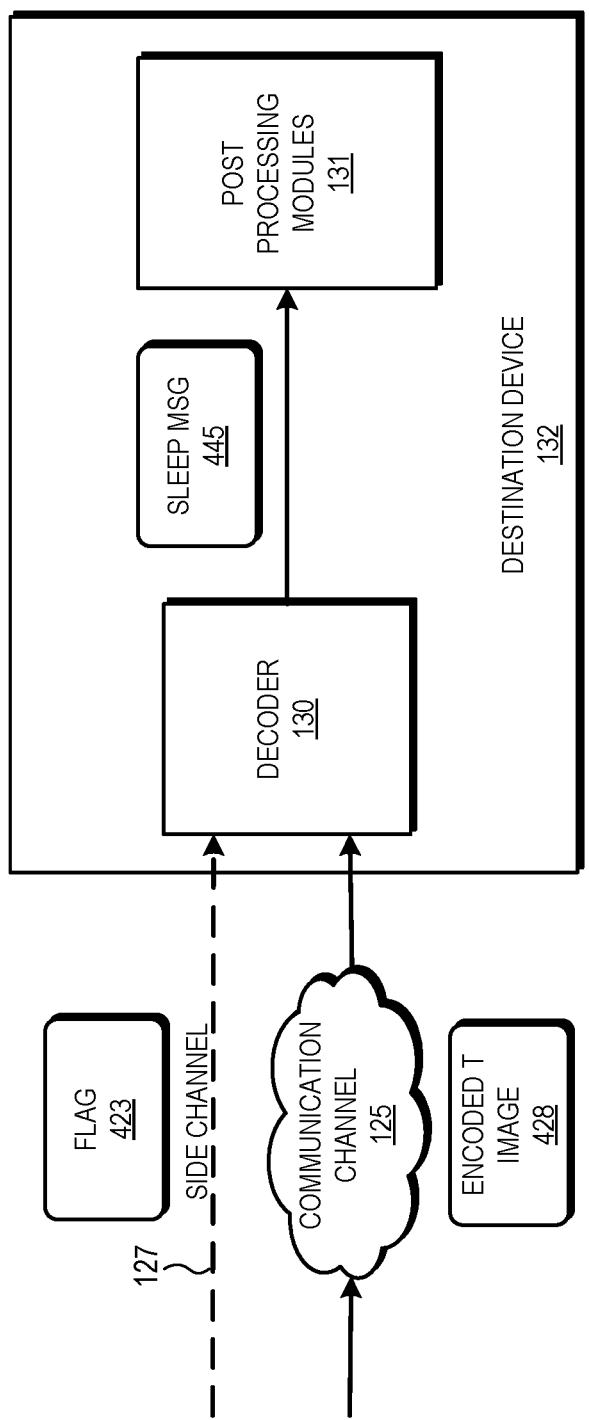
FIG. 4 is a block diagram of a decoder of the multimedia system of FIG. 1 while in operation to transmit a sleep message to post-processing modules in accordance with some embodiments.

FIG. 4 is a block diagram of the decoder 130 of the destination device 132 of the multimedia system 100 of FIG. 1 transmitting a sleep message 445 to the post-processing modules 131 in response to receiving a flag 423 from the encoder (not shown) indicating that pixel value variations between consecutive images are below a threshold in accordance with some embodiments. The decoder 130 receives an encoded T image 428 via the communication channel 125 from the encoder. The decoder 130 also receives the flag 423 via the side channel 127 from the encoder. The decoder 130 selectively suppresses processing the encoded T image 428 based on the information in the flag 423.

If the information and system conditions, such as battery and/or temperature status, indicate that the pixel value variations do not justify the resources that would be used to process the encoded T image 428, the decoder 130 suppresses processing the T image 428 by transmitting the sleep message 445 to the post-processing modules 131 that they should enter or remain in a sleep mode. In some embodiments, the decoder 130 decodes the encoded T image 428 in order to remain synchronized with the encoder, but refrains from transmitting the decoded T image (not shown) to the post-processing modules 131.

Figure 5:
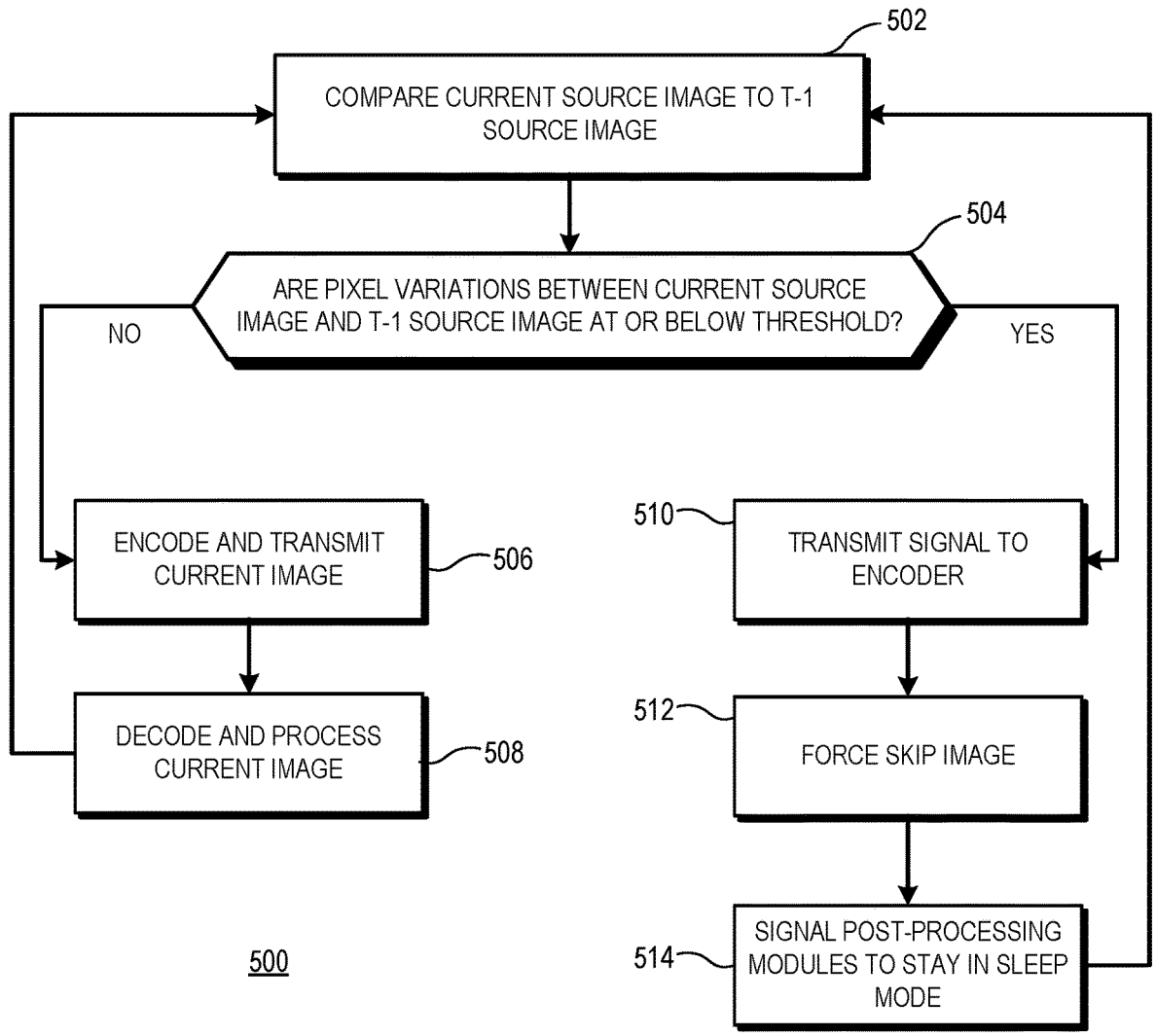
FIG. 5 is a flow diagram illustrating a method for forcing a skip image in accordance with some embodiments.

FIG. 5 is a flow diagram illustrating a method 500 for forcing a skip image in response to detecting that pixel value variations between consecutive images are below a threshold in accordance with some embodiments. The method 500 is implemented in some embodiments of the multimedia system 100 shown in FIG. 1 and the embodiment shown in FIG. 2.

At block 502, the comparator 110 compares pixel values or a signature of a current (source) image 102 to the immediately preceding (T−1) source image 104. At block 504, the comparator 110 determines whether pixel value or signature variations between the current source image 102 and the T−1 source image are at or below the threshold 115. If the pixel value or signature variations exceed the threshold 115, at block 506, the encoder 120 encodes the current source image and transmits the encoded current image to the decoder 130 via the communication channel 125. At block 508, the decoder 130 decodes the encoded current image and the post-processing modules 131 process the current image, and the method flow proceeds back to block 502 for the next source image.

If, at block 504, the comparator 110 determines that the pixel or signature variations between the current source image 102 and the T−1 source image are at or below the threshold 115, in some embodiments at block 510, the comparator 110 transmits a signal to the encoder 120 indicating that the accumulated pixel variations are below the threshold 115. At block 512, in response to receiving the signal indicating that the accumulated pixel variations are below the threshold 115, the encoder 120 forces a skip image 226 via the communication channel 125. At block 514, the decoder 130 receives the skip image 226 and signals the post-processing modules 131 to enter or remain in a sleep mode, and the method flow proceeds back to block 502 for the next source image.

Figure 6:
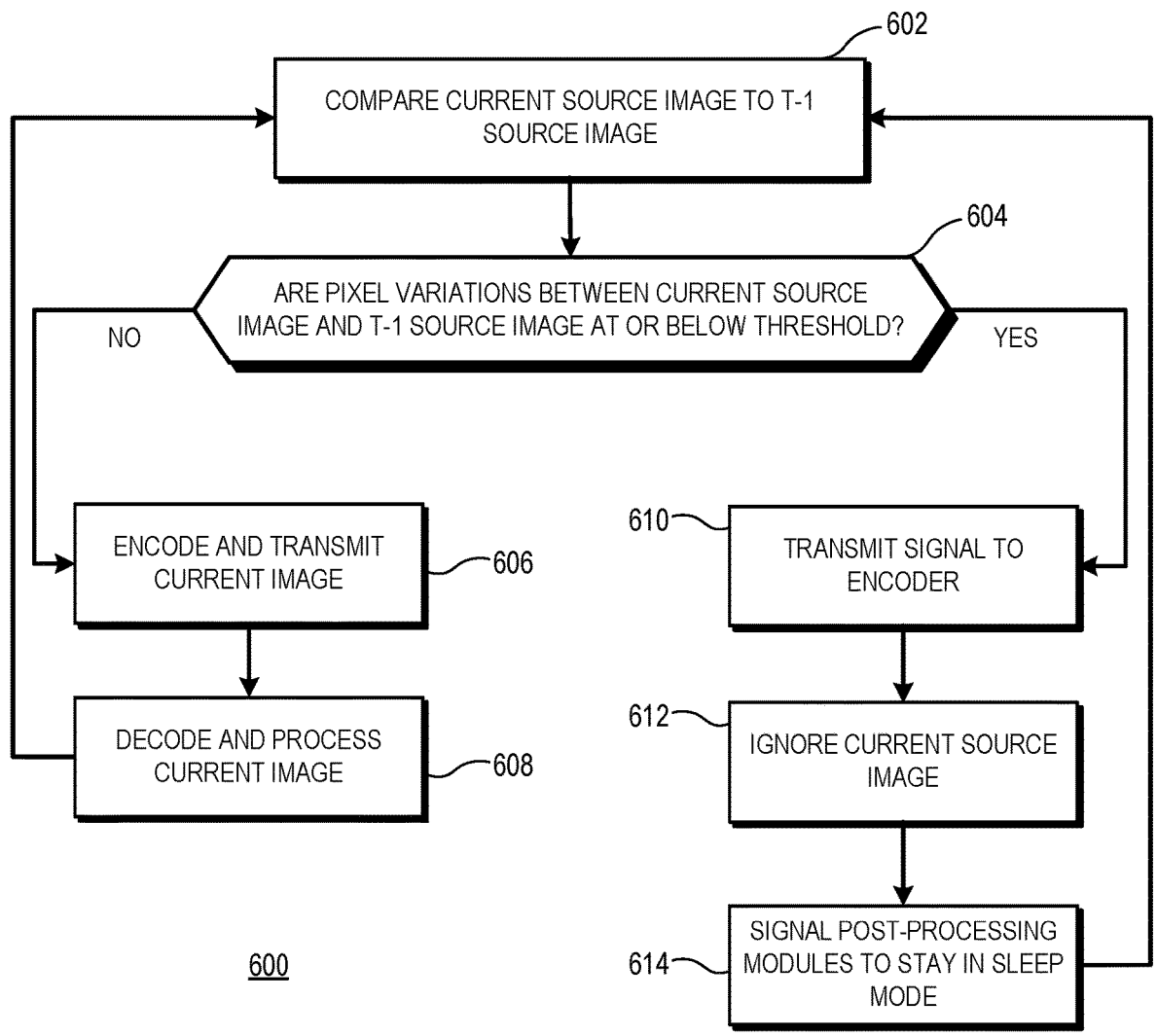
FIG. 6 is a flow diagram illustrating a method for suppressing encoding of a current image in accordance with some embodiments.

FIG. 6 is a flow diagram illustrating a method 600 for suppressing encoding of a current image in response to detecting that pixel variations between the current image and an image immediately preceding the current image are below a threshold in accordance with some embodiments. The method 600 is implemented in some embodiments of the multimedia system 100 shown in FIG. 1.

At block 602, the comparator 110 compares pixel values or a signature of a current (source) image 102 to the immediately preceding (T−1) source image 104. At block 604, the comparator 110 determines whether pixel value or signature variations between the current source image 102 and the T−1 source image are at or below the threshold 115. If the pixel value or signature variations exceed the threshold 115, at block 606, the encoder 120 encodes the current source image and transmits the encoded current image to the decoder 130 via the communication channel 125. At block 608, the decoder 130 decodes the encoded current image and the post-processing modules 131 process the current image, and the method flow proceeds back to block 602 for the next source image.

If, at block 604, the comparator 110 determines that the pixel or signature variations between the current source image 102 and the T−1 source image are at or below the threshold 115, at block 610, the comparator 110 transmits a signal to the encoder 120 indicating that the accumulated pixel variations are below the threshold 115. At block 612, in response to receiving the signal indicating that the accumulated pixel variations are below the threshold 115, the encoder 120 ignores the current source image. At block 614, the decoder 130 detects that an encoded current image was not received, and signals the post-processing modules 131 to enter or remain in sleep mode, after which the method flow proceeds back to block 602 for the next source image.

Figure 7:
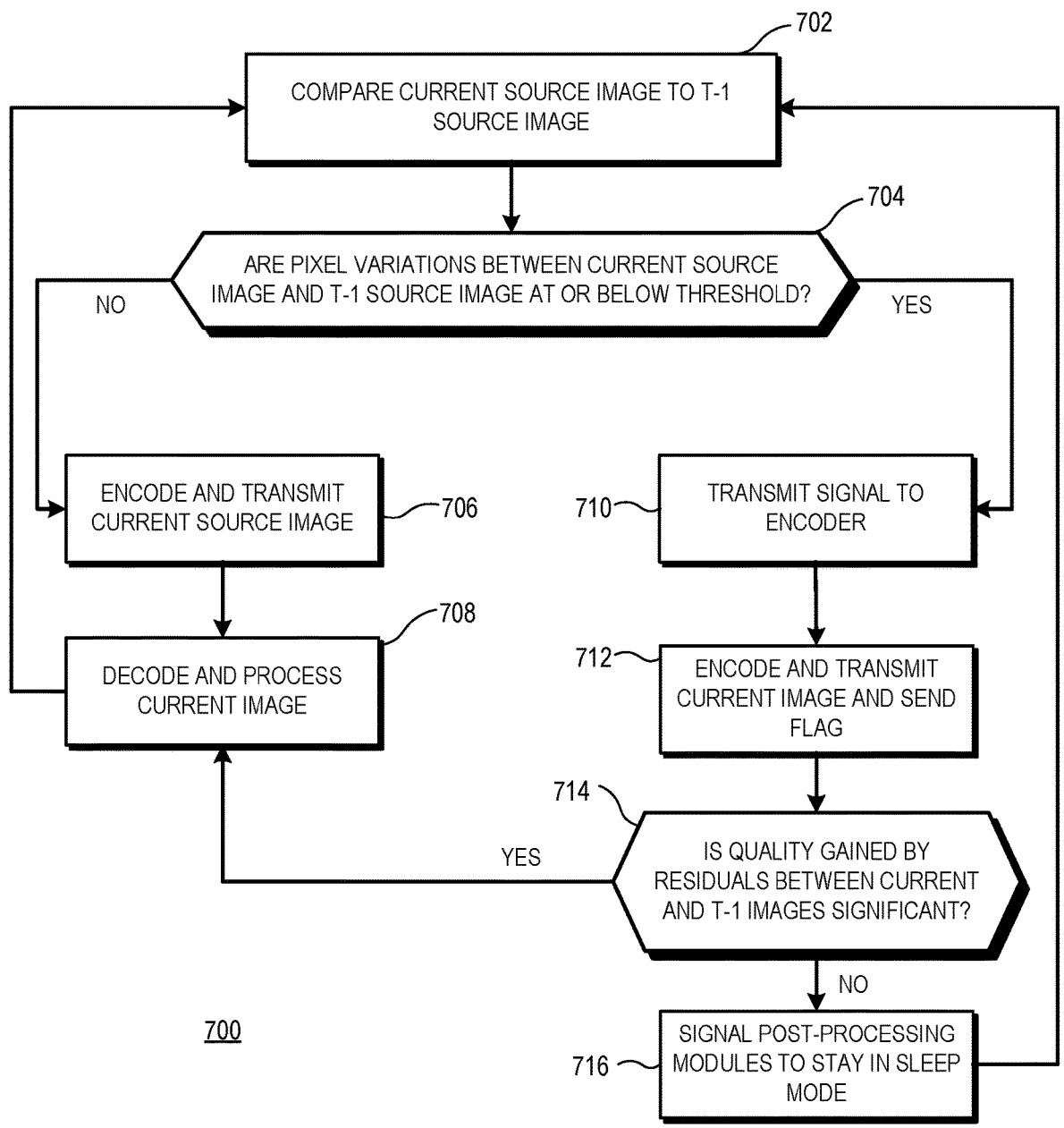
FIG. 7 is a flow diagram illustrating a method for selectively suppressing processing a current decoded image in accordance with some embodiments.

FIG. 7 is a flow diagram illustrating a method 700 for selectively suppressing processing a decoded current image in response to determining that quality gained by processing pixel variations between the current image and an image immediately preceding the current image is below a threshold in accordance with some embodiments. The method 700 is implemented in some embodiments of the multimedia system 100 shown in FIG. 1.

At block 702, the comparator 110 compares pixel values or a signature of a current source image 102 to the immediately preceding (T−1) source image 104. At block 704, the comparator 110 determines whether pixel value or signature variations between the current source image 102 and the T−1 source image are at or below the threshold 115. If the pixel value or signature variations exceed the threshold 115, at block 706, the encoder 120 encodes the current source image and transmits the encoded current image to the decoder 130 via the communication channel 125. At block 708, the decoder 130 decodes and the post-processing modules 131 process the current image, and the method flow proceeds back to block 702 for the next source image.

If, at block 704, the comparator 110 determines that the pixel or signature variations between the current source image 102 and the T−1 source image are at or below the threshold 115, at block 710, the comparator 110 transmits a signal to the encoder 120 indicating that the accumulated pixel variations are below the threshold 115. At block 712, in response to receiving the signal indicating that the accumulated pixel variations are below the threshold 115, the encoder 120 encodes the current source image, and transmits the encoded current image to the decoder 130 via the communication channel 125. Also at block 712, the encoder 120 transmits a flag indicating that the accumulated pixel variations are below the threshold 115 to the decoder 130 via the side channel 127. At block 714, the decoder 130 determines whether the quality gained by decoding the residuals between the current source image 102 and the T−1 source image 104 is significant enough to justify the resources to process the current image. If the decoder 130 determines that the quality gained by processing the residuals between the current source image 102 and the T−1 source image 104 is significant, the method flow proceeds to block 708. If, at block 714, the decoder determines that the quality gained by processing the residuals is not significant, the method flow proceeds to block 716. At block 716, the decoder 130 signals the post-processing modules 131 to enter or remain in sleep mode, after which the method flow continues back to block 702.

In some embodiments, the apparatus and techniques described above are implemented in a system including one or more integrated circuit (IC) devices (also referred to as integrated circuit packages or microchips), such as the multimedia system described above with reference to FIGS. 1-7. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device, in some embodiments, is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium, in one embodiment, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are implemented, for example, in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above about specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   identifying pixel variations between a first image and a second image immediately preceding the first image;
   comparing the identified pixel variations to a specified threshold; and
   selectively encoding, at an encoder, the first image in response to the identified pixel variations being equal to or less than the specified threshold, wherein selectively encoding comprises one of:
   ignoring and suppressing encoding the first image;
   forcing a skip image in lieu of encoding the first image; or
   encoding the first image and transmitting to a decoder a flag indicating a magnitude of the identified pixel variations.

2. The method of claim 1, further comprising:
   transmitting a signal from a comparator to the encoder indicating that the first image is the same as the second image.

3. The method of claim 1, further comprising:
   suppressing, at a decoder, decoding the skip image in response to the encoder forcing a skip image in lieu of encoding the first image.

4. The method of claim 1, further comprising:
   transmitting the first image from the encoder to a decoder; and
   transmitting a signal from the encoder to the decoder, the signal instructing the decoder to suppress processing the first image.

5. The method of claim 1, further comprising:
   transmitting the first image from the encoder to a decoder;
   transmitting a signal from the encoder to the decoder, the signal indicating a magnitude of the identified pixel variations; and
   selectively processing the first image in response to the signal indicating the magnitude of the identified pixel variations.

6. The method of claim 5, further comprising:
   determining, at the decoder, resources required to process the first image and selectively suppressing processing the first image based on the resources required to process the first image and the magnitude of the identified pixel variations.

7. The method of claim 5, further comprising:
   signaling post-processing modules to remain in a lower power mode in response to determining that quality gained by processing the first image does not justify resources that would be used to process the first image based on the magnitude of the identified pixel variations.

8. The method of claim 1, wherein the identified pixel variations are non-zero pixel variations.

9. A device, comprising:
   a comparator to identify pixel variations between a first image and a second image immediately preceding the first image and compare the identified pixel variations to a specified threshold; and
   an encoder couplable to a decoder via a side channel, the encoder to selectively encode the first image in response to the identified pixel variations being equal to or less than the threshold by performing one of:
   ignoring and suppressing encoding the first image;
   forcing a skip image in lieu of encoding the first image; or
   encoding the first image and transmitting to a decoder a flag indicating a magnitude of the identified pixel variations.

10. The device of claim 9, wherein the comparator is further to transmit a signal to the encoder, the signal indicating that the first image is considered to be the same as the second image, in response to the identified pixel variations being equal to or less than the threshold.

11. The device of claim 9, wherein the encoder is to transmit the first image to the decoder and transmit a signal to the decoder via the side channel, the signal indicating a magnitude of the identified pixel variations.

12. The device of claim 11, wherein the encoder is to suppress encoding the first image in response to the signal indicating that the identified pixel variations are below the threshold.

13. The device of claim 9, wherein the identified pixel variations are non-zero pixel variations.

* * * * *